United States Patent [19]

Moore et al.

[11] Patent Number: 4,575,848

[45] Date of Patent: Mar. 11, 1986

[54] METHODS AND APPARATUS FOR CORRECTING A SOFTWARE CLOCK FROM AN ACCURATE CLOCK

[75] Inventors: William H. Moore, Bridgewater, N.J.; William J. Trosky, Pittsburgh, Pa.

[73] Assignee: Westinghouse Electric Corp., Pittsburgh, Pa.

[21] Appl. No.: 576,061

[22] Filed: Feb. 1, 1984

[51] Int. Cl.[4] .............................................. G06F 11/00
[52] U.S. Cl. ...................................... 371/61; 364/200
[58] Field of Search ................. 371/61; 364/200, 900; 307/269

[56] References Cited

U.S. PATENT DOCUMENTS

| | | | |
|---|---|---|---|
| 4,388,688 | 6/1983 | Curlee, III et al. | 364/200 |
| 4,392,196 | 7/1983 | Glenn et al. | 364/200 |
| 4,419,739 | 12/1983 | Blum | 364/900 |
| 4,428,044 | 1/1984 | Liron | 364/200 |
| 4,503,490 | 3/1985 | Thompson | 364/200 |

Primary Examiner—Charles E. Atkinson
Attorney, Agent, or Firm—D. R. Lackey

[57] ABSTRACT

Apparatus and methods for correcting a software clock remote from an accurate clock, which include determining the error between the remote software clock and accurate clock, and in addition to periodically downloading the correct time to the software clock, a correction factor is also downloaded which attempts to correct the error.

14 Claims, 6 Drawing Figures

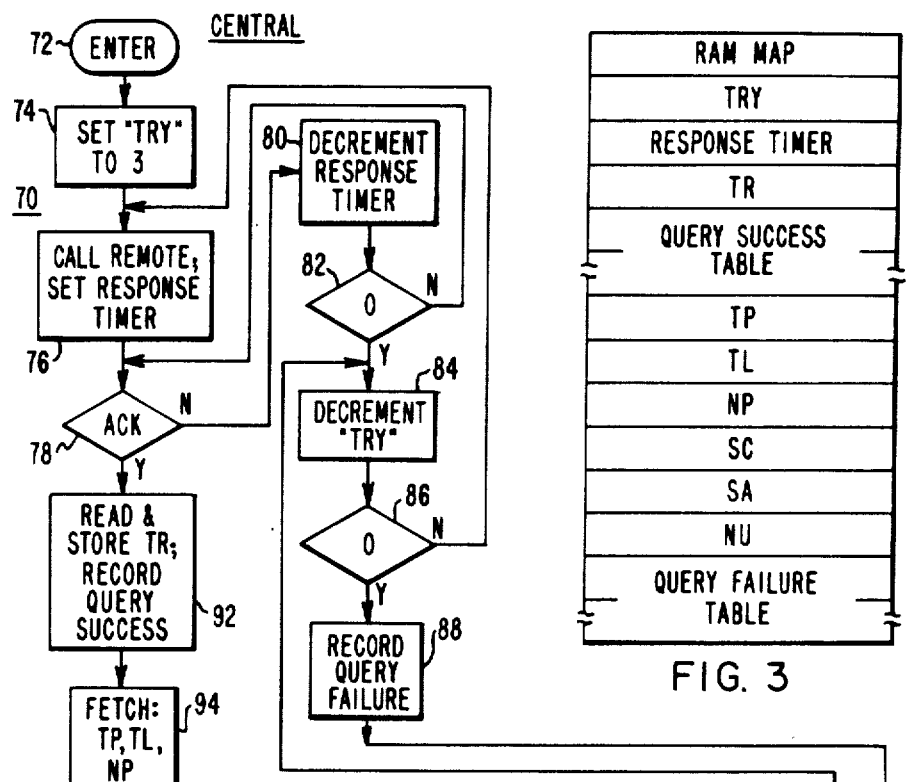
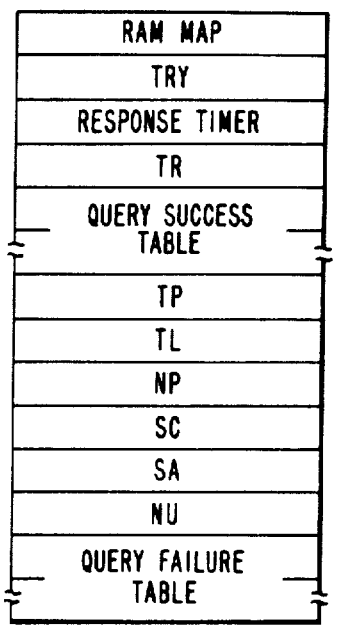
FIG. 3
FIG. 2

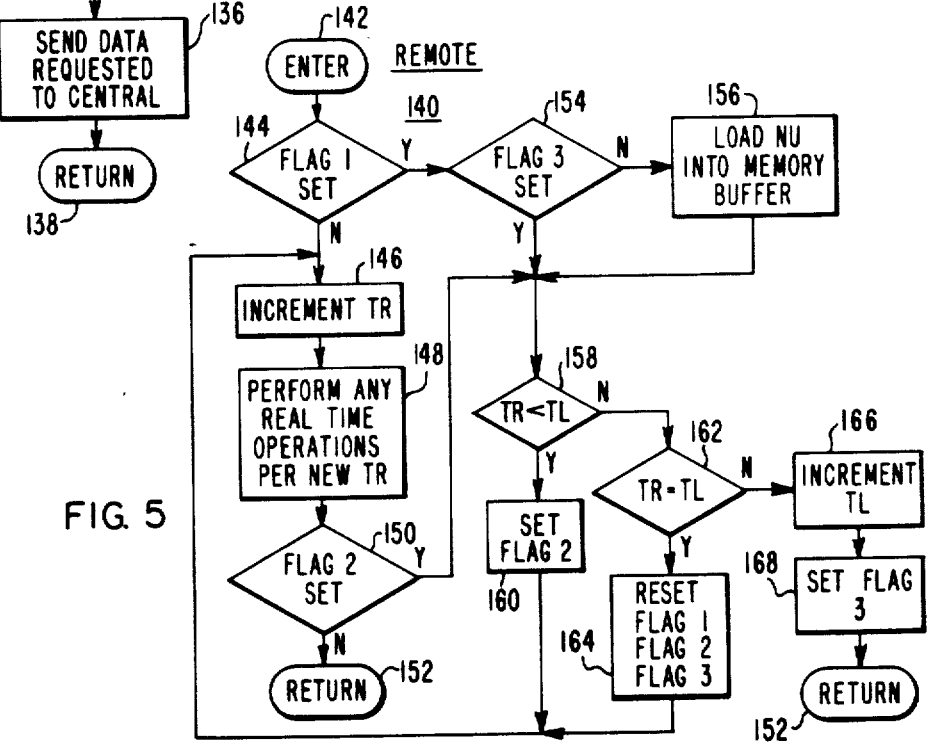

METHODS AND APPARATUS FOR CORRECTING A SOFTWARE CLOCK FROM AN ACCURATE CLOCK

BACKGROUND OF THE INVENTION

1. Field of the Invention

The invention relates in general to distributed computer systems, and more specifically to new and improved methods and apparatus for correcting the software clock of a microcomputer located remotely from a central computer having an accurate clock.

2. Description of the Prior Art

It is common in distributed computer systems for a remote computer to collect data related to time maintained by the remote computer, with a central computer periodically reading and interpreting the data. For correct interpretation, it is usually important that the remote clock accurately reflects real time. The crystal controlling the remote computer's internal clock has an original error, requiring special initial testing to determine the number of crystal pulses generated in one second, and subsequent special programming of the value into the read-only-memory (ROM) of each remote computer unit. The internal clock of the remote computer, however, is also subject to additional errors, not initially determinable, such as errors due to temperature and aging. A conventional method for correcting such errors would be to simply down load the correct time each time the central computer interrogates the remote computer. This has the disadvantage of introducing a step input to the value of the remote time, and the error can progressively become worse as time and/or temperature effects cause the oscillator frequency to drift more and more from the design value. The step input causes data errors, such as elapsed time measurements. It can cause processes performed on a real time basis to be performed twice if the clock is set back behind the time for a process already performed, or it can cause processes to be skipped entirely if the clock is set ahead beyond the time for the process.

SUMMARY OF THE INVENTION

Briefly, the present invention includes new and improved methods and apparatus for correcting a software clock in a computer remote from a central computer which maintains a correct clock. The central computer interrogates the remote computer at known time intervals and reads the software time TR. It compares TR with the correct time TL, and determines the error, if any, since the last reading. The software clock generates its time using a predetermined constant N. The central computer prepares a correction factor, e.g., an updated value for N, responsive to the error and, in addition to the correct time TL, it downloads the updated value of N to the remote computer. The remote computer conforms TR to the downloaded TL, and it uses the updated value of N to maintain TR during the next time interval.

Thus, the effects of long term drift are eliminated, as the correction is continually being made. Each correction would be so small that there would be no significant correction steps to create the problems associated with the method which would simply download the correct time. An added benefit of the invention is the fact that it automatically corrects for the original error in the crystal on the first update, so special initial testing and special ROM programming of each unit is not required. The design value would simply be stored in the ROM's of all units.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 2 is a flow chart of a program for the central computer, formulated according to the teachings of the invention;

FIG. 3 is a RAM map which illustrates certain of the data and signals stored in the RAM of the central computer from time to time;

FIG. 4 is a flow chart of a program called by the remote computer when it is interrogated by the central computer;

FIG. 5 is a flow chart of a program run by the remote computer each time it receives an interrupt from the software timing arrangement; and FIG. 6 is a RAM map which illustrates certain of the data, signals and flags stored in the RAM of the remote computer from time to time.

DESCRIPTION OF PREFERRED EMBODIMENTS

Figure 1:
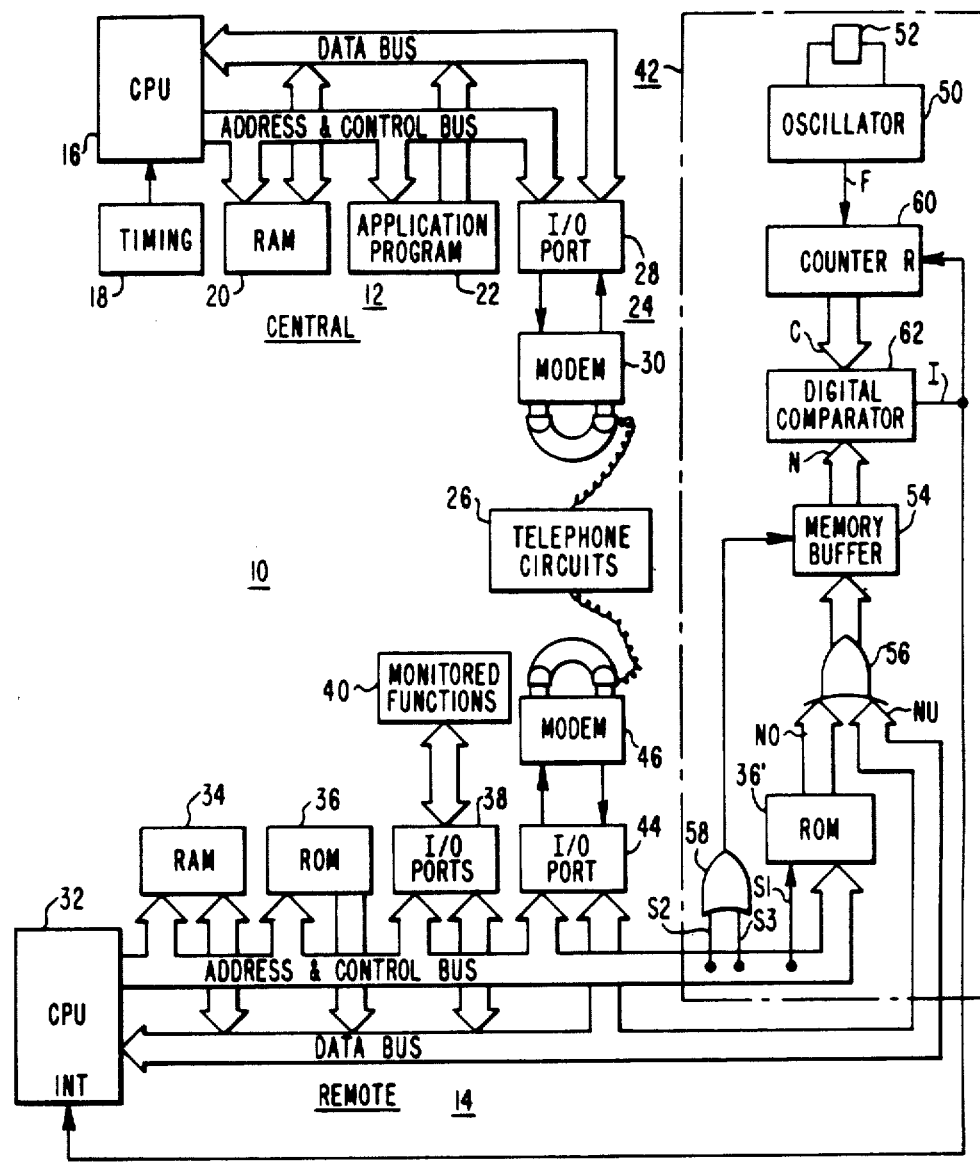
FIG. 1 is a schematic diagram of a distributed computer system constructed according to the teachings of the invention.

Referring now to the drawings, and to FIG. 1 in particular, there is shown a distributed computer system 10 constructed according to the teachings of the invention. System 10 includes a central computer 12, such as a mini-computer, and a remote computer 14, such as a microcomputer. The central computer 12 includes a central processing unit (CPU) 16, system timing 18, which includes an accurate clock for maintaining real time TL, a random access memory (RAM) 20, memory means 22 which stores the application program, such as magnetic disc storage, and means 24 for establishing a communication link with the remote system 14. The preferred communication link includes telephone circuits 26, and thus means 24, in the preferred embodiment, includes a serial I/O port 28 and a modem 30.

The remote computer 14 includes a CPU 32, a RAM 34, a ROM 36, parallel I/O ports 38 which obtain information relative to the processes and functions being monitored, shown generally at 40, a software clock 42 which maintains the time of day in RAM 34, and a serial I/O port 44 and a modem 46 for communicating with the central computer 12 via the telephone circuits 26.

The software clock 42, and the methods for correcting it, are constructed and formulated according to the teachings of the invention. An oscillator 50 controlled by a crystal 52 provides a train of pulses F at a predetermined design frequency. The number of pulses F which should be generated in a predetermined unit of time, such as one second, according to the design frequency, is stored at a predetermined address in ROM. This is referred to as count NO. In practice, it would be stored in ROM 36, but for purposes of explanation, it is illustrating as being stored in a separate ROM 36'.

Upon initial start-up, ROM 36' is selected by an appropriate control signal S1 and the location of ROM 36' which holds the count NO is addressed, momentarily applying count NO to a memory buffer or latch 54 via a group of OR gates, shown generally at 56. A control signal S2 is applied to buffer 54 via an OR gate 58, to latch the count NO.

A counter 60 counts the pulses F and provides a count C which is applied to one input of a digital comparator 62. The count held in buffer 54, referred to generally as count N, is applied to the other input of comparator 62. When count C reaches count N, comparator 62 outputs an equality signal I which resets counter 60 and provides an interrupt for CPU 32. CPU 32, as will be hereinafter described in detail, increments the remote time TR by one second, in response to the interrupt.

The description to this point describes a workable software clock, but as hereinbefore pointed out, oscillator 50 would have to be specially tested to determine the original error in crystal 52, and to determine the specific value of NO for oscillator 50. This specific value would then have to be "burned" into ROM 36'. Errors in the frequency of oscillator 50 due to age and temperature would then have to be corrected by central computer 12, by downloading the correct time TL, and changing the remote time TR accordingly. As hereinbefore stated, this would produce a step change in time TR, which will usually increase in magnitude as time and temperature effects cause the oscillator frequency to drift more and more from its design value. In the meantime, the magnitude of data errors will also increase and processes and functions performed on a real time basis may be performed twice, or not at all, depending upon whether the remote time TR is fast or slow.

The present invention solves these problems, and enables the ROMs 36' of all remote units to be programmed with the same count NO, based upon the design frequency of oscillator 50. The central computer system 12 periodically interrogates the remote computer system 14 to obtain data relative to the monitored processes and functions 40, and at the same time, it reads the remote time TR. System 12 then computes a correction factor and provides a new or updated count value NU for memory buffer 54, applying the count NU to the OR gates 56 and thus to the buffer 54, while strobing the new count information NU into buffer 54 via a control or strobe signal S3 applied to OR gate 58. Thus, the remote time TR is kept accurate to the resolution of the time unit selected, which in the present example is one second. An implementation of the methods of the invention are set forth in the following program flow charts.

FIG. 2 is a flow chart of an application program 70 for central computer 12, which is stored in memory means 22. FIG. 3 is a RAM map illustrating the various signals and data stored in RAM 20 from time to time during the running of program 70. Program 70 may be called on a time interrupt basis, to periodically retrieve the data gathered by the remote computer 14, or at any other time by authorized personnel at the site of the central computer. Program 70 is entered at a starting address indicated at 72, and step 74 sets a software counter TRY in RAM 34 to a predetermined value, such as three. Step 76 calls the remote computer 14 by dialing its telephone number and a software response timer in RAM 34 is set to a predetermined value, i.e., a reasonable time for the remote computer 14 to answer and acknowledge the call. Step 78 checks to see if the remote computer 14 being called has responded with its ID number and an ACK, indicating it has received the call. If step 78 finds no response, step 80 decrements the response timer and step 82 checks to see if it has timed out. If it is still active, i.e., greater than zero, step 82 returns to step 78. This loop continues until step 78 finds an acknowledgement signal ACK, or step 82 finds that the response time has expired. If the response time expires without receiving a response from the remote computer 14, step 84 decrements the count TRY and step 86 checks to see if this counter has been decremented to zero. If not, step 86 returns to step 76 to place the call again. If there is no response within the response time, the call is dialed again, and this continues until the count TRY reaches zero, at which time step 88 records the failure of the query in a query failure table in RAM 34, and the program returns to the program interrupted, or to a priority executive, at 90. For example, the date and time of day of the query may be recorded, as well as the ID number of the remote computer which was called. Maintenance personnel periodically read out this stored information to determine if there are problems in the communication links with the remote systems which are under the supervision of the central computer 12. If the remote computer system being called responds within the framework of the steps just described, the program of the remote computer called will automatically send its time TR, which is read and stored by step 92. Step 92 may also record the query success in RAM 20, in a query success table.

Step 94 then retrieves the correct time TL, the time TP of the previous query to this specific remote site, and the previous count value NP prepared for this remote site. Step 94 may test NP, and if it is zero, such as upon start-up, step 94 may retrieve count NO from ROM 22, and use it instead of NP.

Step 96 determines the number of seconds SC which have elapsed since the last query, according to the remote software clock, by subtracting TP from TR. Step 98 determines the number of seconds SA which have elapsed since the last query according to the correct clock maintained by the central computer, by subtracting TP from TL. Step 100 then prepares a correction factor by dividing SC by SA, and it prepares an updated count NU by multiplying the correction factor (SC divided by SA) by the previous count value NP.

Step 102 sends the updated count NU and the correct time of day TL to the remote computer, and it also sets the response timer stored in RAM 20. Steps 104, 106 and 108 are similar to steps 78, 80 and 82, respectively. If the response time expires without an acknowledgement that the data sent has been correctly received, step 108 may return to step 84 to see if there is any count left in the TRY counter. If so, the program starts over at step 76, trying to establish communication with the remote computer. It would also be suitable for a step similar to step 74 to be inserted after step 100, for steps similar to steps 84 and 86 to be inserted after step 108, and for the step similar to step 86 to proceed to step 102 when count TRY is found to be non-zero.

If step 104 detects an acknowledgement signal ACK within the response time, step 104 proceeds to step 110 which stores the value of the present correct time TL at location TP, which thus becomes the time of the last query. Step 110 also stores the update count value NU at location NP, which thus becomes the count value of the last update. Step 110 may also record the query success in the query success table in RAM 20.

Step 112 may send request-for-data commands to the remote computer 14, and it would also set the response timer. Step 114 contains steps similar to steps 78, 80, 84 and 86, and if the data is sent as requested, it receives and stores the data. The program then exits at 90.

FIG. 4 is a flow chart of a program 120 called by the remote computer 14 when it receives a call from the central computer 12. FIG. 6 is a RAM map of RAM 34, illustrating signals, flags and data stored in RAM 34 from time to time during the running of program 120, as well as during the running of an interrupt program 140 shown in FIG. 5.

More specifically, when the remote computer 14 is called or queried by the central computer 12, the remote computer 12 runs program 120, entering it at 122. Step 124 sends the identification number of the remote computer, it sends an acknowledgement signal ACK and also its time TR to the central computer. The central computer 12 then sends the correct time TL and the updated count NU (step 102 of FIG. 2) which are received and stored by the remote computer 14 in steps 126 and 128. Step 130 sends the acknowledgement signal ACK to the central computer 12 in step 130, and step 132 sets flag 1 in RAM 34 to indicate that an updated count NU has been received from the central computer. Step 134 receives and stores the data request codes sent by the central computer in step 112 of FIG. 2, and step 136 of FIG. 4 sends the data requested to the central computer 12. The program exits at 138.

Each time the equality signal I is provided by the digital comparator 62 shown in FIG. 1, it is applied to an interrupt input of CPU 32. CPU 32 stores what it is doing when interrupted, so it can initiate an orderly return to the program being run, and special vectors are generated by the operating program of CPU 32 which direct the program to the start 142 of the interrupt program 140. Step 144 checks flag 1 to see if a new update count NU has been received. If flag 1 is not set, no new update count has been received and the program proceeds to step 146 which increments the software time TR by one unit of time, which is one second in the present example.

Step 148 checks to see if the new time TR requires any real time operations to be performed, and if so, it directs the performance of these operations and collects and stores the associated data. Step 150 checks to see if flag 2 has been set. At this point of the description, flag 2 will not have been set, and the program returns to the interrupted program at 152.

If step 144 finds flag 1 is set, indicating a new update count NU has been received, step 144 branches to step 154 which checks to see if a flag 3 has been set. At this point of the description, flag 3 will not have been set and step 154 advances to step 156 which loads the updated value NU into the memory buffer 54 shown in FIG. 1. CPU 32 does this by placing the count NU on the data bus shown in FIG. 1, and by generating a strobe or control signal S3 which causes the memory buffer 54 to latch the new count NU.

Step 156 then proceeds to a portion of the program which corrects the software time TR, if it is different than the correct time TL. Time TL had been previously down-loaded to the remote computer and stored in RAM 34 due to step 126 of FIG. 4. Step 158 checks to see if the remote time TR is less than the correct time TL. If it is, step 160 sets flag 2, which is the "slowclock" flag. A slow clock is corrected immediately, without skipping any real time operations, by returning to step 146 which increments TR. Step 148 then performs any real time operations required by the new time and step 150 will now find flag 2 set. If step 158 still finds TR is less than TL, steps 160, 146, 148 and 150 are repeated. This loop will continue until step 158 finds that TR is not less than TL, with the program then branching to step 162.

Step 162 checks to see if TR is equal to TL. If the clock had been slow, it will have been corrected until TR is equal to TL, so step 162 advances to step 164 which resets flags 1, 2 and 3. Since the present interrupt occurred after TL was received in step 126 of FIG. 4, TR should be incremented by one second, and thus step 164 returns to step 146. Step 150 will now find flag 2 reset, and the program returns to the interrupted program at 152.

If the software timer TR is not slow, but fast, step 158 will find TR is not less than TL, step 162 will find TR is not equal to TL, and step 162 thus branches to step 166 which increments the value of the downloaded correct time TL stored in RAM 34. Step 168 sets flag 3, the "fast-clock" flag, and the program returns to the interrupted program at 152. It will be noted that when the software clock is fast, step 156 is performed, loading the updated count NU into the memory buffer, but step 146 which increments TR is omitted. TR is fast, and thus it is not incremented until real time catches up with it. This is determined by incrementing the downloaded value of the correct time TL, instead of incrementing TR.

On the next one-second interrupt, steps 144 and 154 will find both flags 1 and 3 set, and if real time has not caught up with the software time TR, step 162 will again proceed to step 166. When the incremented downloaded correct time equals TR, step 162 will detect this fact, step 164 will reset the flags, step 146 will increment TR, step 148 will perform any real time operations required by the new time, step 150 will find flag 2 reset, and the program exits at 150. It will be noted that since the fast time TR was not set back, no real time operations are performed twice.

If clock TR was not fast or slow, the program 140 would simply follow steps 144, 154, 156, 158, 162, 164, 146, 148 and 150.

In summary, there has been disclosed a new and improved distributed computer system in which a computer having a software clock is corrected by a computer having an accurate clock. The original crystal error in the software clock, and subsequent errors in the software clock due to drifting of the crystal from its design value, are all automatically taken care of by the disclosed invention which continuously checks for errors between the software clock and the correct clock, and it provides a correction factor for the software clock which will not cause the drift to cause large errors between the software time and real time. Further, when correction of the software clock is required, the conforming of the software clock to the correct clock is done without skipping any processes which are to be performed in real time, or without performing them twice. If the software clock is slow, it is incremented one second at a time, with each incrementing step being followed by a step which checks to see if any real time operations should be performed at the new software time. If the software clock is fast, it is not set back, but held at the "fast" value until real time catches up with it, at which time it is allowed to be incremented by the one second interrupts.

We claim as our invention:

1. A method of correcting a software clock from a correct clock, comprising the steps of:
   reading a softward clock at known time intervals,
   deterimining the error, if any, between the software clock and a correct clock since the last reading thereof,
   preparing a correction factor for the software clock in response to the error.
   downloading the correction factor and correct time to the software clock,
   conforming the time of the software clock to the downloaded correct time,
   and using the correction factor in updating the software clock.

2. The method of claim 1 wherein the software clock is remote from the correct clock, and wherein the step of downloading includes the step of establishing a telephone link between the software and correct clocks.

3. A method of correcting a software clock which maintains time TR, from an accurate clock which maintains correct time TL, wherein the software clock counts pulses and provides an output I every N pulses, which output increments TR, comprising the steps of:
   interrogating the software clock at known intervals of time determined from the accurate clock, to obtain TR,
   conforming TR with TL after each interrogation step,
   determining the number SC of outputs I added to TR since the previous interrogation,
   determining the number SA of outputs I which should have been added to TR according to the correct clock,
   multiplying N by the ratio SC divided by SA to provide an updated value for N,
   substituting the updated value for the previous value of N,
   and using the updated value of N to determine when the output I should be provided.

4. The method of claim 3 wherein the conforming step is performed by the software clock by steps which include comparing TR and TL to determine whether TR is fast, slow or correct, incrementing TR when TR is slow, until TR equals TL, and incrementing TL, instead of TR, with the outputs I, when TR is fast, until TR equals TL.

5. The method of claim 3 wherein the interrogating step utilizes telephone circuits as a communication link between the accurate clock and the software clock.

6. The method of claim 3 wherein the step of interrogating the software clock at known time intervals includes the step of storing the time TP of the previous interrogation, the step of determining SC subtracts TP from TR, and the step of determining SA subtracts TP from TL.

7. A method of correcting a software clock which maintains time TR, from an accurate clock which maintains time TL, comprising the steps of:
   generating pulses at a predetermined nominal rate subject to error,
   counting the pulses to provide a count C,
   outputting an equality pulse I each time C equals a predetermined value N,
   resetting C and incrementing TR in response to each update pulse,
   reading TR at known time intervals,
   determining the error, if any, between TR and TL since the previous step of reading TR,
   providing an adjusted value for N responsive to the error,
   downloading the correct time TL and the adjusted value of N to the software clock,
   conforming TR with the download correct time TL, and using the download value of N to provide the equality pulses I.

8. The method of claim 7 wherein the conforming step includes the steps of incrementing TR when it is slow, until TR equals the downloaded TL, and incrementing the downloaded TL instead of TR with each equality pulse when TR is fast, until TL reaches the value of TR.

9. The method of claim 7 wherein the reading and downloading steps include the step of establishing a communication link between the accurate clock and software clock, which includes telephone circuits.

10. The method of claim 7 including the step of performing predetermined functions at predetermined real times, and the step of checking, each time TR is incremented, to determine if a function should be performed.

11. The method of claim 10 wherein the conforming step includes the step of incrementing TR when it is slow, until TR equals the downloaded TL, with the checking step checking the new time TR, after each increment, even during the process of correcting the slow TR.

12. A distributed computer system, comprising:
    a central computer having an accurate clock which maintains time TL,
    and a remote computer having a software clock which maintains time TR,
    said central computer including:
    means reading the software clock at known time intervals,
    means determining the error, if any, between TR and TL since the last reading thereof,
    means preparing a correction factor for the software clock responsive to the error,
    and means downloading the correction factor and correct time TL to the remote computer,
    said remote computer including:
    means for conforming the time TR to the downloaded correct time TL,
    and means for using the correction factor in generation of the software time.

13. The system of claim 12 wherein the downloading means includes telephone circuits.

14. A distributed computer system, comprising:
    a central computer having an accurate clock which maintains time TL,
    and a remote computer having a software clock which maintains time TR,
    said software clock including:
    means providing pulses F at a predetermined nominal rate which may drift,
    means maintaining a count C of said pulses,
    memory means storing a count value N representing the number of pulses F which should be generated in a predetermined unit of time,
    means comparing C and N and providing an equality signal I when C reaches N,
    means resetting the count C in response to each equality signal,
    and means incrementing TR in response to at least certain of said equality signals,
    said central computer including:

means for interrogating said remote computer at known time intervals to read TR, means determining the error, if any, between TR and TL since the previous reading of TR, means providing an updated value of N responsive to the error, and means downloading the correct time TL and updated value of N to the remote computer, said remote computer including:

means for substituting the updated value of N for the previous value in the memory means, and means for conforming its time TR with the downloaded correct time TL.

* * * * *